United States Patent
Basu et al.

(10) Patent No.: US 8,649,125 B1
(45) Date of Patent: Feb. 11, 2014

(54) POLE TIP SHIELD FOR A MAGNETIC WRITE ELEMENT HAVING NOTCHED OR TRUNCATED SIDE SHIELDS

(75) Inventors: Swaraj Basu, Londonderry (GB); Alex Yu Loong Wong, Londonderry (GB); Muhammad Asif Bashir, Londonderry (GB); Mark Gubbins, Letterkenny (IE); Robert W. Lamberton, Limavady (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/617,328

(22) Filed: Sep. 14, 2012

(51) Int. Cl.
*G11B 5/11* (2006.01)

(52) U.S. Cl.
USPC .................................................. 360/125.3

(58) Field of Classification Search
None
See application file for complete search history.

(56) References Cited

U.S. PATENT DOCUMENTS

| | | | |
|---|---|---|---|
| 7,889,456 B2 * | 2/2011 | Jiang et al. | 360/125.08 |
| 8,094,419 B2 | 1/2012 | Guan | |
| 8,120,874 B2 | 2/2012 | Hsiao et al. | |
| 8,279,562 B2 * | 10/2012 | Gao et al. | 360/319 |
| 8,472,136 B2 * | 6/2013 | Batra et al. | 360/119.04 |
| 2007/0223142 A1 * | 9/2007 | Takekuma et al. | 360/131 |
| 2007/0268626 A1 | 11/2007 | Taguchi et al. | |
| 2009/0262636 A1 * | 10/2009 | Xue et al. | 369/126 |
| 2010/0232062 A1 * | 9/2010 | Gao et al. | 360/123.12 |
| 2011/0007428 A1 * | 1/2011 | Batra et al. | 360/319 |
| 2011/0261486 A1 | 10/2011 | Han et al. | |

FOREIGN PATENT DOCUMENTS

WO 2012036680 A1 3/2012

* cited by examiner

*Primary Examiner* — Allen T Cao
(74) *Attorney, Agent, or Firm* — Deirdre Megley Kvale; Westman, Champlin & Koehler, P.A.

(57) ABSTRACT

The application discloses pole tip shield assemblies for a magnetic write element. The shield assemblies disclosed include side shields to limit adjacent track interference. The side shields are truncated or notched at a midpoint to form an expanded non-magnetic gap along a trailing portion of the pole tip to enhance write field and/or field gradient. The expanded non-magnetic gap region is larger than the non-magnetic gap region along a leading portion of the pole tip.

20 Claims, 7 Drawing Sheets

POLE TIP SHIELD FOR A MAGNETIC WRITE ELEMENT HAVING NOTCHED OR TRUNCATED SIDE SHIELDS

BACKGROUND

Data storage devices store data on a magnetic storage media. Demand for smaller form factors devices increases the demand for higher areal densities for the stored data. The increased areal density reduces track width and spacing, thus increasing instances of adjacent track erasure or interference. Magnetic shields are used to reduce adjacent track erasure and interference, however, flux leakage to the shields can interfere with write performance.

SUMMARY

The application discloses a pole tip shield for a magnetic write element including side shields to limit adjacent track interference. The side shields extend along a pole tip of the write element forward of a mid-point of the pole tip. The side shields include a notched or truncated portion downtrack from the midpoint of the pole tip to form an expanded non-magnetic gap region larger than a non-magnetic gap region along a forward portion of the pole tip to enhance write field and field gradient.

BRIEF DESCRIPTION OF THE DRAWINGS

The application includes FIGS. 1-7 as described below. Features illustrated in FIGS. 1-7 are not necessarily drawn to scale as some features are exaggerated or shown in larger form than other features for the purposes of clarity and illustration.

DETAILED DESCRIPTION OF ILLUSTRATIVE EMBODIMENTS

Figure 1:
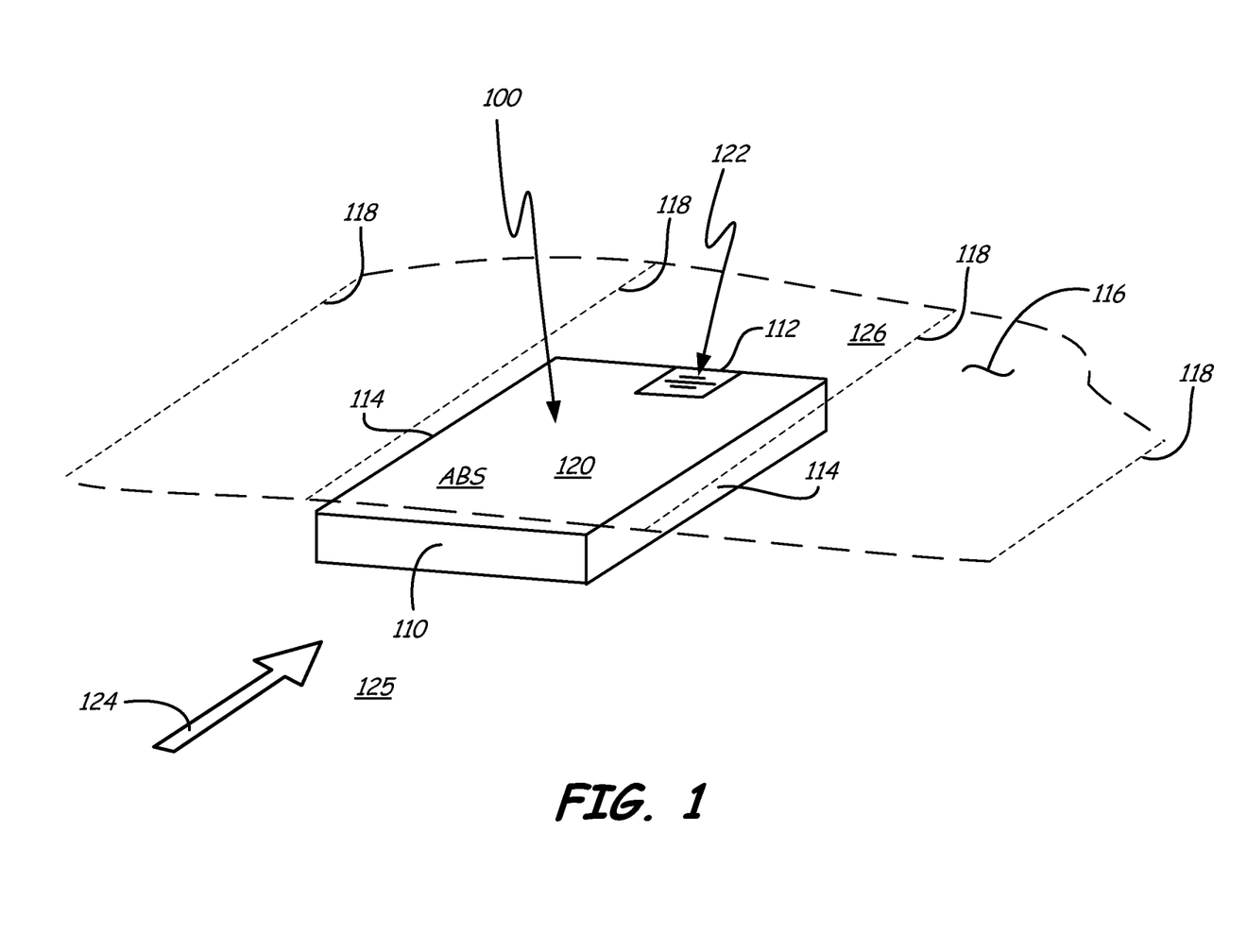
FIG. 1 illustrates a head including one or more transducer elements fabricated on a slider body or substrate having an air bearing surface facing a magnetic storage media according to one embodiment.

The present application relates to a pole tip shield for a write assembly of a magnetic head 100 as illustrated in FIG. 1. According to one embodiment shown in FIG. 1, the head 100 includes a leading edge 110, a trailing edge 112 and opposed sides 114. The head 100 interfaces with a magnetic storage media 116 having one or more tracks 118 to store data. As shown, the head 100 includes an air bearing surface 120 which faces the media 116. As schematically shown, transducer elements 122 are fabricated along the air bearing surface 120 proximate to the trailing edge 112 of the head 100. Typically, the transducer elements 122 are deposited on a wafer and the wafer is sliced into bars to etch the air bearing surfaces 120 of the head 100. In the illustration shown in FIG. 1, the media 116 is shown above the head 100 so that the transducer elements 122 and the air bearing surface 120 face the magnetic storage media 116 for read and/or write operations.

For operation, movement or rotation of the magnetic storage media 116 provides an air flow along the air bearing surface 120 of the head 100. Air flows along the air bearing surface 120 of the head 100 from the leading edge 110 to the trailing edge 112 in a direction illustrated by arrow 124. For proximity or near proximity recording, the air flow along the air bearing surface 120 is pressurized to provide a lifting force so that the head "floats" about the media 116 for read and/or write operations. The air bearing surface 120 is etched to provide a desired pressure profile for read and write operations. Thus as shown, air flows from an uptrack region 125 of the media 116 forward of the leading edge 110 of the head 100 to a down track region 126 of the media 116 downtrack from the trailing edge 112 of the head 100.

Figure 2:
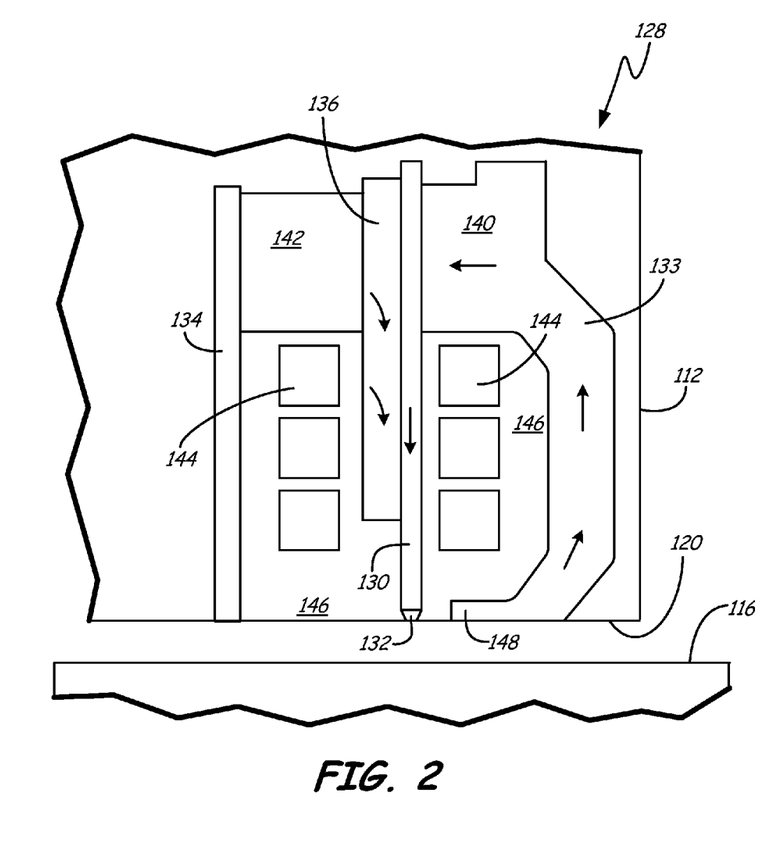
FIG. 2 is a cross-sectional view of a write assembly for the head illustrated in FIG. 1 configured to write data to the magnetic storage media according to one embodiment.

The transducer elements 122 on the head 100 typically include a read assembly including a read element such as a magnetoresistive read element and a write assembly as schematically shown in cross-section in FIG. 2. The write assembly 128 as shown in FIG. 2 includes a main pole 130 having a pole tip 132, a top return pole 133 and a bottom return pole 134. The main pole 130 is coupled to a yoke 136 and is connected to the top return pole 133 and the bottom return pole 134 through top and bottom back vias 140, 142. The bottom return pole 134 is closer to the leading edge 110 of the head than the top return pole 133. Reference to top and bottom refers to an order of deposition of the bottom pole layer to form the bottom return pole 134 and top pole layer to form the top return pole 133.

A magnetic flux path is induced in the main pole 130 and pole tip 132 via energization of coils 144 wrapped about the main pole 130 by supplying current through the coils 144. The direction of the flux path is controlled via the direction of the current supplied to the coils 144. The coils 144 are surrounded by a non-magnetic insulating gap 146 between the main pole/yoke 130 and the top return pole 133 and the bottom return pole 134. As shown, a trailing shield 148 is positioned downtrack of the pole tip 132 and is magnetically connected to the return pole 133 to provide a flux path from the main pole 130 through the media 116 to the return pole 133.

The flux path induced via energization of the coils 144 records data on a magnetic recording layer of the storage media 116. In an illustrated embodiment, data is perpendicularly recorded on the storage media 116 so that the recorded data bits are in an up/down orientation relative to the media 116. Due to geometry of the components, the head 100 is typically positioned at a skew angle relative to a center-line of a track of a circular media. Since the orientation of the head (and write element) is offset at a skew angle, operation of the write element can interfere with data recorded on adjacent tracks 118. The write assembly 128 includes a pole tip shield to reduce fringe flux and thus limit adjacent track interference ATI. Flux leakage from the pole tip 132 tends to reduce the "effective field" produced by the write assembly 128 also reducing the downtrack field gradient.

The present application discloses embodiments of a pole tip shield assembly 150 to improve field and field gradient for write operations while keeping the adjacent track interference within manageable proportions as shown in FIGS. 3-7. The embodiments shown in FIGS. 3-7 illustrate various pole tip shield assemblies 150 as viewed from the air bearing surface 120 of the head 100. As shown in detail in FIG. 3, the pole tip 132 of the write assembly 128 has a pole tip surface along the air bearing surface 120. The pole tip surface along the air bearing surface 120 has a width in a cross-track direction 152 and a length in the downtrack direction 154 defined by a leading edge 160, a trailing edge 162 and opposed side edges 164. The side edges 164 of the pole tip 132 are sloped to provide a trapezoidal shape for the pole tip 132 that has a narrow width profile at the leading edge 160 of the pole tip 132 and a wider profile at the trailing edge 162.

Figure 3:
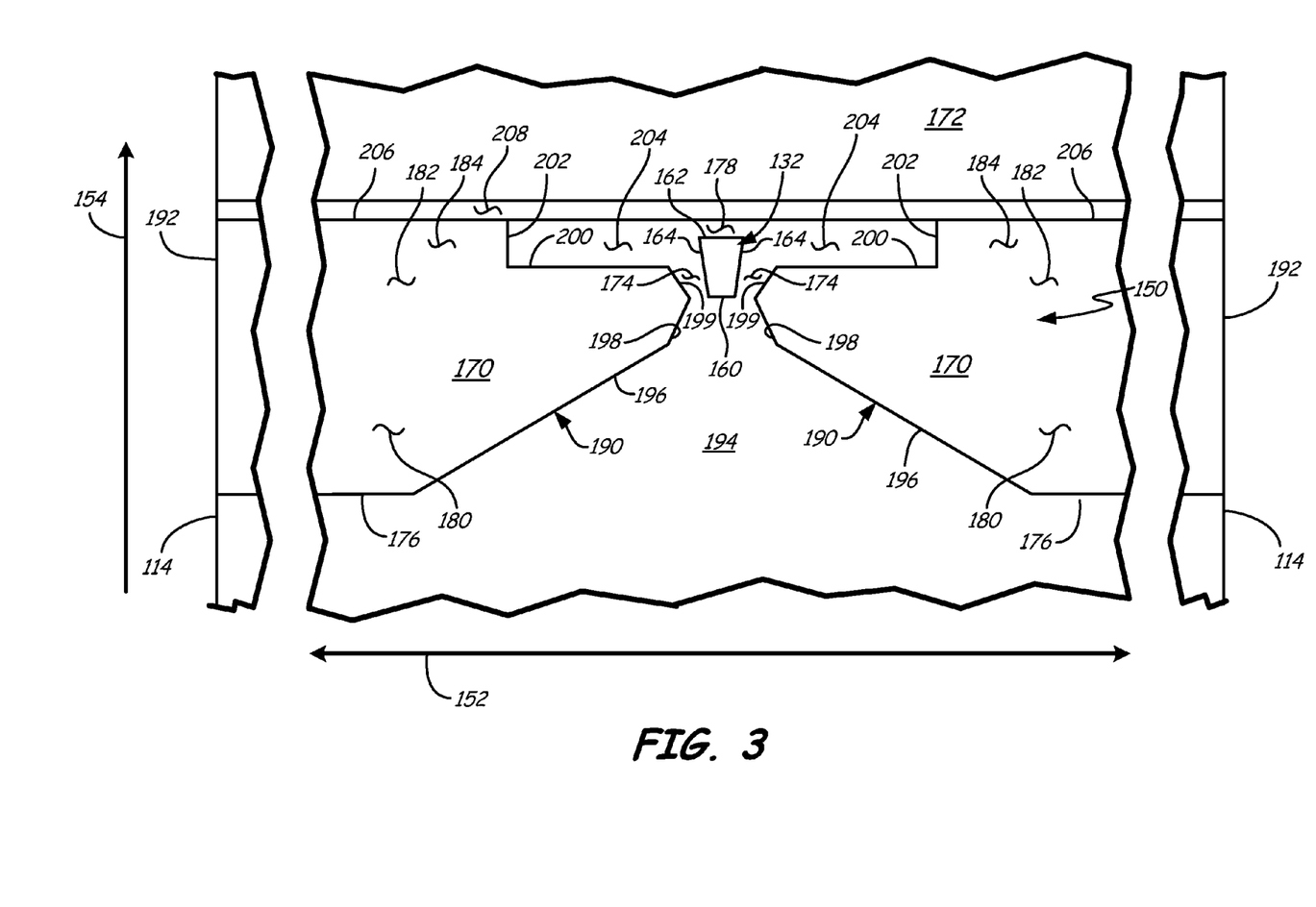
FIGS. 3-7 illustrate embodiments of a pole tip shield for the write assembly illustrated in FIG. 2.

The shield assembly 150 shown in FIG. 3 includes side shields 170 along side edges 164 of the pole tip 132 and a trailing shield 172. Trailing shield 172 shown in FIG. 3 is coupled to top return pole 133 similar to trailing shield 148 illustrated in FIG. 2. As shown, the side shields 170 are spaced from sides 164 of the pole tip to form a non-magnetic gap region 174 between the side shields 170 and the pole tip 132. As shown the trailing shield 172 is spaced downtrack of the pole tip 132 to form a non-magnetic gap region 178 between the trailing edge 162 of the pole tip 132 and the trailing shield 172. The side shields 170 have a length extending from a leading edge 176 of the side shields 170 in the downtrack direction 154 to form a leading portion 180, a mid portion 182 and a notched trailing portion 184.

The leading edge 176 of the side shields 170 is spaced uptrack or forward from the leading edge 160 of the pole tip 132. The leading portion 180 of the side shields 170 extends from the leading edge 176 of the side shields to the leading edge 160 of the pole tip 132. A width of the side shields 170 along the leading portion extends from an inner side edge 190 to an outer side edge 192. The outer side edges 192 of the shields 170 correspond to the sides 114 of the head 100. As shown, the inner side edges 190 of the side shields 170 are spaced to form a leading non-magnetic gap region 194 forward or uptrack of the leading edge 160 of the pole tip 132.

As shown, inner side edges 190 along the leading portion 180 of the side shields 170 are sloped inwardly so that the width of the leading non-magnetic gap region 194 narrows in the downtrack direction towards the leading edge 160 of the pole tip 132. In particular, the inner side edges 190 have a first sloped edge portion 196 and a second sloped edge portion 198. The slope angle of the first edge portion 196 is larger than the slope angle of the second edge portion 198 as measured relative to the downtrack direction 154 to reduce the taper angle of the non-magnetic gap region 194 proximate to the pole tip 132 in comparison to the non-magnetic gap region 194 uptrack or forward from the pole tip 132.

The mid portion 182 of the side shields 170 extends along the side edges 164 of the pole tip 132 from the leading edge 160 of the pole tip to a mid point of the pole tip 132. The mid portion includes a width that extends from edge portion 199 of the inner side edge 190 to the outer side edge 192 as shown. The non-magnetic gap region 174 is formed between the side edges 164 of the pole tip 132 and the inner side edges 190 (or edge portions 199) of the mid portions 182 of the side shields 170. As shown, edge portions 199 of the side shields 170 are sloped outwardly away from the pole tip. In one embodiment, the slope angle is conformal with the tapered sides 164 of the pole tip 132 to provide a constant width for non-magnetic gap region 174 along the side edges 164 of the pole tip 132. In another illustrated embodiment, edge portions 199 are sloped to provide a gap width that increases in the downtrack direction 154.

The trailing portion 184 of the side shields 170 is notched to form an inner trailing edge 200 extending cross-wise (in the cross-track direction 152) proximate to the mid-point of the pole tip 132 and a notched inner side edge 202 spaced outwardly from inner edge 190 or edge portion 199. The inner trailing edge 200 intersects inner side edge 190 (or edge portion 199) proximate to the mid-point of the pole tip 132. In the embodiment shown, inner side edge 202 is generally straight, but it should be understood that edge 202 can be sloped outwardly away from the pole tip 132 towards sides 114 of the head. The notched inner region bounded by the inner trailing edge 200 and notched inner side edge 202 is filled with a non-magnetic material to form an expanded non-magnetic gap region 204 along a trailing portion of the pole tip 132. In the embodiment shown, the expanded non-magnetic gap regions 204 extend from the inner trailing edges 200 of the side shields 170 to the trailing shield 172. A width 200 of the trailing portion 184 of the side shields 170 extends from the notched inner edge 202 to outer edge 192 and a length extends to an outer trailing edges 206 spaced downtrack from the inner trailing edge 200. In the embodiment shown, the side shields 170 are coupled to the trailing shield 172 through a seed layer 208 deposited during the fabrication process to form the trailing shield 172 and remaining layers of the write assembly 128.

In the illustrated embodiments, the pole tip 132, side shields 170 and trailing shield 172 are formed of a high moment alloy, such as Fe60Co40, although alternate magnetic materials can be used as appreciated by those skilled in the art. The non-magnetic gap areas or regions 174, 178 194 and 204 between the side shields 170, trailing shield 172 and the pole tip 132 are formed of a non-magnetic and electrically insulating material such as Alumina. In the illustrated embodiment, the conductive trailing seed layer 208 separates side shields 170 from trailing shield 172 and illustratively is formed of a soft magnetic material preferably of high moment to facilitate flux flow to the trailing shield 172 and top return pole 133 of the write assembly 128. Typically, the width between opposed sides 114 of the head 100 is approximately 48 microns (μm). As previously described, the width of the side shields 170 extends generally to side edges 114 of the head as shown. The recessed dimension of the notched inner side edge 202 of the side shields 170 from edge portion 199 can vary between 50-500 nm.

As previously described, the trailing shield 172 is coupled to the top return pole 133 to provide a flux return path for fringe flux shunted to the side shields 170. As shown, the notched inner side edge 202 is spaced outwardly from the inner side edge 190 along the mid portion 182 of the side shields 170 to provide the enlarged or expanded non-magnetic gap region 204 proximate to the trailing edge 162 of the pole tip in comparison to the non-magnetic gap region 174 proximate to the leading edge 160 of the pole tip 132. The enlarged non-magnetic gap region 204 limits flux leakage proximate to the trailing edge of the pole tip 132 to enhance the write field and field gradient while the leading and mid side shield portions 180, 182 shield the pole tip 132 to limit adjacent track interference ATI.

Figure 4:
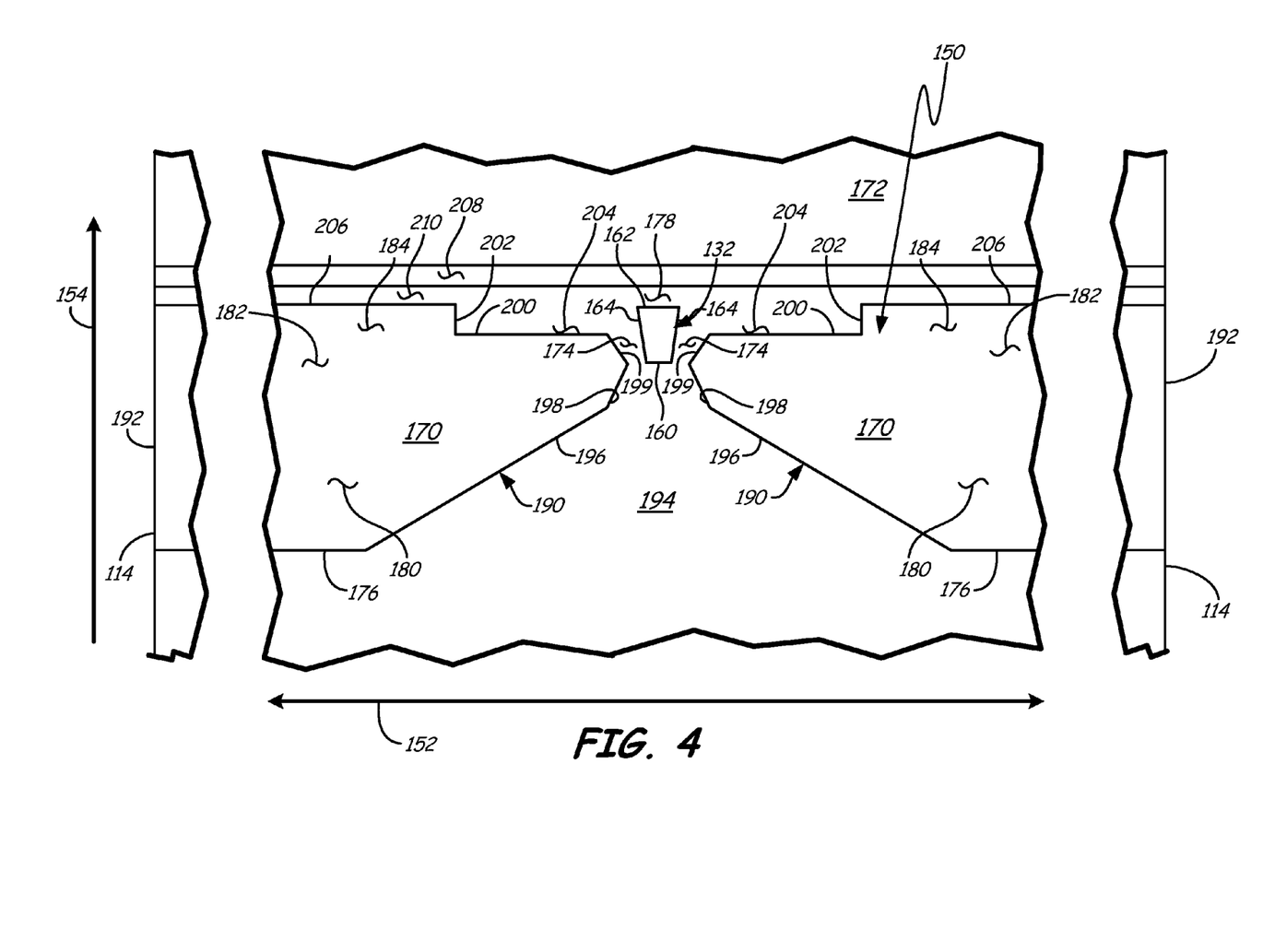

FIG. 4 illustrates another embodiment of a shield assembly 150 for the pole tip 132 of the write assembly 128 wherein like numbers are used to refer to like parts in the previous FIGS. In the embodiment illustrated in FIG. 4, the outer trailing edges 206 of the side shields 170 are spaced from the seed layer 208 and trailing shield 172 to form an insulated gap region 210 between the outer trailing edge 206 of the side shields 170 and the trailing shield 172. As shown, the outer trailing edges 206 are spaced uptrack or forward of the trailing shield 172 to aligned with the trailing edge 162 of the pole tip to provide a non-magnetic gap separating the side shields 170 from the trailing shield 172 across the width of the head (in the cross-track direction 152) between opposed sides 114 of the head 100.

Figure 5:
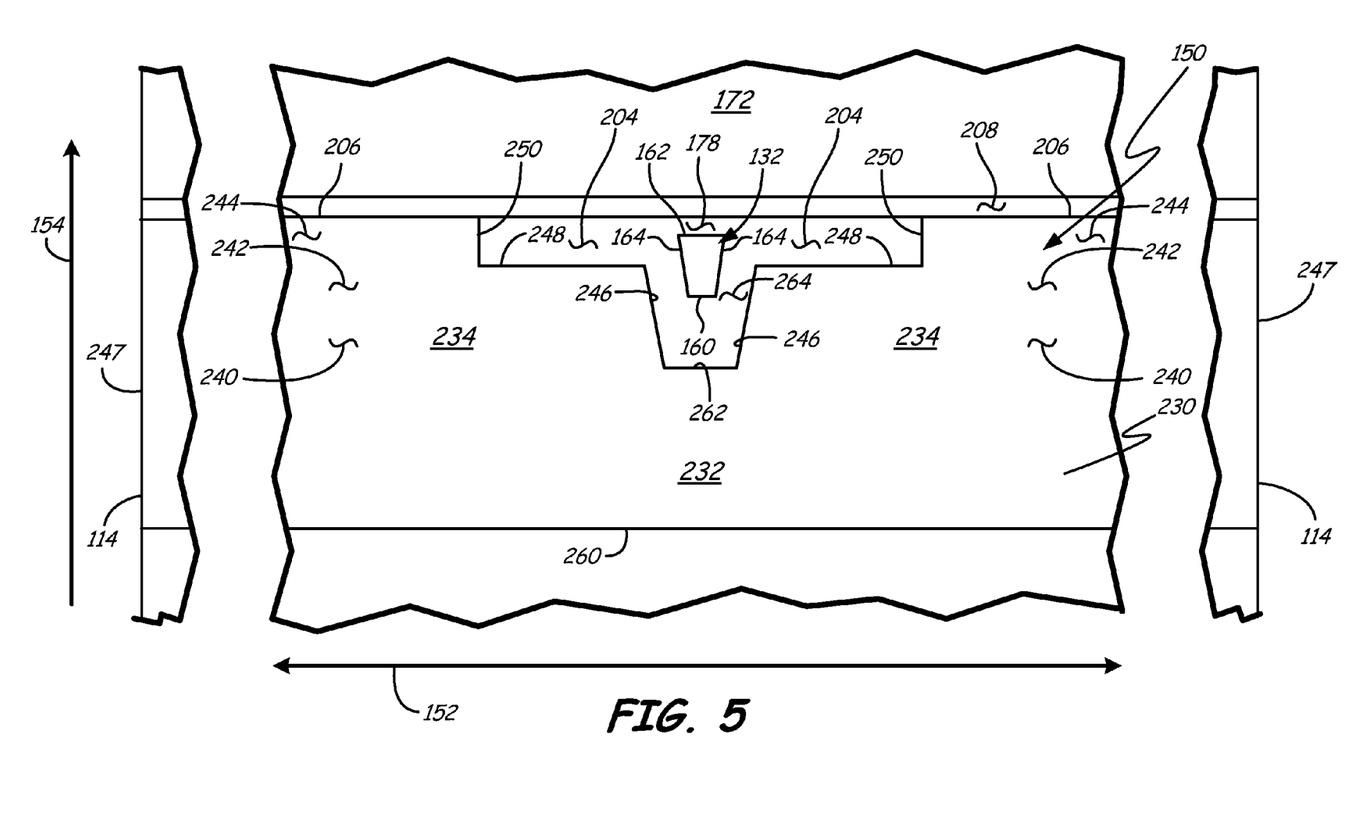

FIG. 5 illustrates an additional embodiment of a shield assembly 150 including a trailing shield 172 and box shield 230 extending about the pole tip 132. The box shield 230 as shown forms a leading shield 232 and opposed spaced side shields 234. The leading shield 232 is spaced uptrack or forward from the leading edge 160 of the pole tip 132 and extends cross-wise between opposed sides 114 of the head 100 to connect to the side shields 234 extending along the side edges 164 of the pole tip 132. As shown, the side shields 234 include the leading portion 240, a mid portion 242 and trailing portion 244. A width of the leading and mid portions 240, 242 of the side shields 234 is defined between inner side edges 246 and outer side edges 247. The outer side edges 247 align with the outer sides 114 of the head 100. The trailing portion 244 is notched to form an inner trailing edge 248 extending crosswise and a notched inner side edge 250 spaced outwardly from inner side edge 246 away from the pole tip 132. The notched area or region defined by the inner trailing edge 248 and the notched inner side edge 250 forms the expanded non-magnetic gap region 204 as previously described with respect to the embodiments shown in FIGS. 3-4.

As shown, a length of the leading shield 232 extends from a leading edge 260 to a trailing edge 262. The trailing edge 262 of the trailing shield 232 is spaced uptrack from the leading edge 160 of the pole tip 132 and the inner side edges 246 of the side shields 234 are spaced from the side edges 164 of the pole tip 132 to provide a non-magnetic gap region 264 uptrack or forward from the pole tip 132 and along the side edges 164 of a leading portion of the pole tip 132. The trailing edge 162 of the pole tip 132 is spaced forward from the trailing shield 172 and seed layer 208 to form non-magnetic gap region 178 as previously described. The expanded non-magnetic gap regions 204 have a width that extends from the side edges 164 of the pole tip 132 to the notched inner side edges 250 of the side shields 234 and a length that extends from the inner trailing edge 248 to the trailing shield 172.

A width of the trailing portions 244 of the side shields 234 extends from the notched inner side edge 250 to the outer edge 247 and a length of the trailing portions 244 extends to the outer trailing edges 206 proximate to the trailing shield 172. In the illustrated embodiment, the inner trailing edge 248 is located at a mid point of the pole tip 132 between the leading and trailing edges 160, 162 of the pole tip 132 to provide the expanded non-magnetic gap region 204 as previously described. As shown, inner side edges 246 of the side shields 234 are sloped outwardly so that a width of the side shields 234 decreases in the downtrack direction to provide a constant or fixed width for the non-magnetic gap region 264 along the pole tip 132. Inner side edge 250 can also be sloped as illustrated in FIG. 6 and application is not limited to a straight inner side edge 250 as shown.

Figure 6:
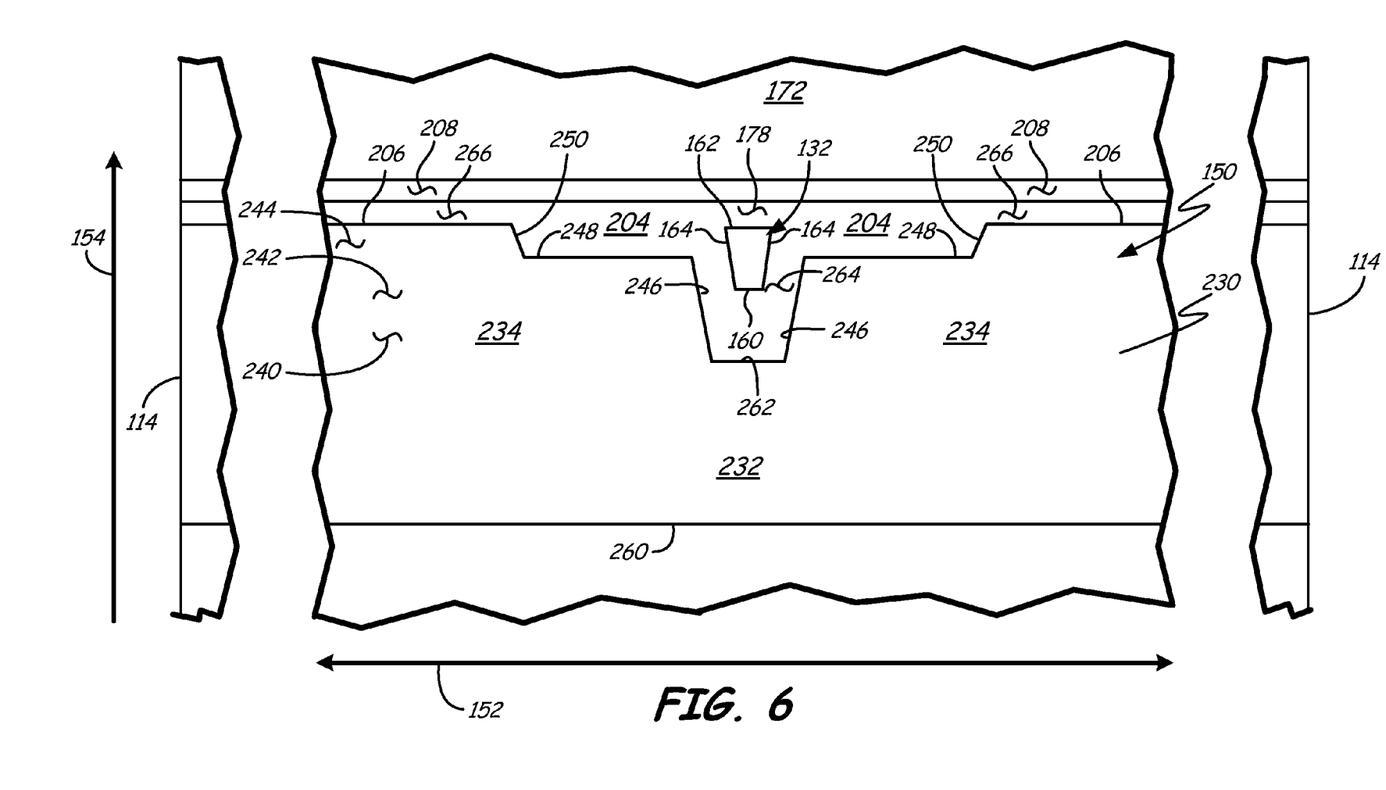

FIG. 6 illustrates another embodiment of a shield assembly 150 including a trailing shield 172 and box shield 230 where like numbers are used to refer to like parts in FIG. 5. In the embodiment shown in FIG. 6, the box shield 230 includes leading shield 232 forward of the pole tip 132 and side shields 234 extending downtrack from the leading shield 232 along side edges 164 of the pole tip 132 as described in FIG. 5. In the embodiment illustrated in FIG. 6 the outer trailing edge 206 of the side shields 234 is spaced uptrack or forward from the seed layer 208 and trailing shield 172 to form an insulated gap region between the outer trailing edge 206 of the side shields 234 and the trailing shield 172. Thus as shown, the side shields 234 include inner trailing edge 248 and an outer trailing edge 206 spaced uptrack from the trailing shield 172 to form a non-magnetic gap region that extends between opposed sides 114 of the head including an inner non-magnetic gap region 204 between the inner trailing edge 248 and the trailing shield 172 and an outer non-magnetic gap region 266 between the outer trailing edge 206 and the trailing shield 172. As shown, a length of the outer non-magnetic gap region 266 is smaller than the inner non-magnetic gap region 204 which forms the expanded non-magnetic gap region along the trailing portion of the pole tip 132.

Figure 7:
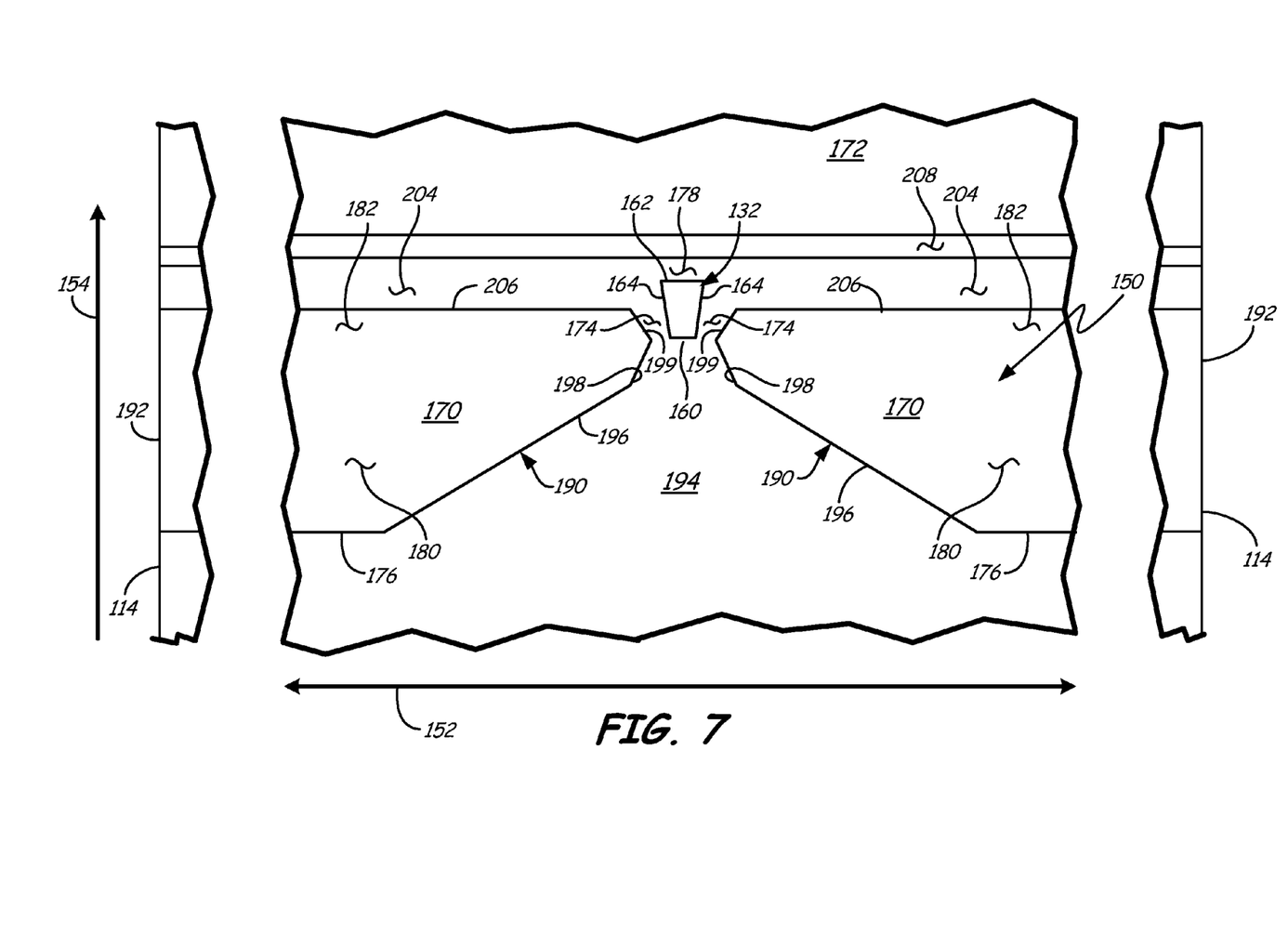

FIG. 7 illustrates another embodiment of a pole tip shield including side shields 170 where like numbers are used to refer to like parts in the previous FIGS. As previously described, the trailing shield 172 is spaced from trailing edge 162 of the pole tip 132 to form the non-magnetic gap region 178 between the pole tip 132 and the trailing shield 172. As shown, a length of the side shields 170 coextends along sides 164 of a leading portion of the pole tip 132 to a trailing edge 206 forward from the trailing edge of the pole tip 132 to form truncated side shields. As shown, the leading edge 176 of the side shields 170 is spaced uptrack or forward from the leading edge 160 of the pole tip 132. The length of the side shields 170 between the leading and trailing edges 176, 206 provides a leading portion 180 and mid portion 182. In the illustrated embodiment, the trailing edge 206 extends crosswise proximate to a mid point of the pole tip 132 between the leading and trailing edges 160, 162 of the pole tip 132 to form the truncated side shields. Thus the non-magnetic gap region 204 has a length that extends from the trailing edge 206 proximate to the mid point of the pole tip 132 to the trailing shield 172 and a width that extends between opposed sides 114 of the head 100.

A width of the side shields 170 extends between the inner side edge 190 to the outer side edge 192. As previously described, the inner side edges 190 along the leading portions 180 of the side shields 170 are sloped inwardly so that the width of the non-magnetic leading gap region 194 narrows in the downtrack direction towards the leading edge 160 of the pole tip 132. In particular, the inner side edges 190 have a first sloped edge portion 196 and a second sloped edge portion 198. The slope angle of the first edge portion 196 is larger than the slope angle of the second edge portion 198 as measured relative to the downtrack direction to reduce the taper angle of the non-magnetic gap region 194 proximate to the pole tip 132 in comparison to the non-magnetic gap region 194 forward from the pole tip 132.

Side edges 190 include sloped edge portions 199 extending downtrack from the leading edge 160 of the pole tip 132. The sloped edge portions 199 are sloped outwardly at an angle conformal with the taper angle of side edges 164 of the pole tip 132 to provide a constant width for the non-magnetic gap region 174 separating the side shields 170 from the side edges 164 of the pole tip 132. In an alternate embodiment, the edge portions 199 are sloped to provide a non-magnetic gap region 174 width that increases in the downtrack direction. Thus, as described, side shields 170 in FIG. 7 provide a shield to limit ATI while providing an expanded non-magnetic gap region 204 to limit flux leakage to enhance write field and field gradient.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application, while maintaining substantially the same functionality without departing from the scope and spirit of the present invention. In addition, although embodiments described herein are shown for a particular write assembly, it will be appreciated by those skilled in the art that the teachings of the present invention can be applied to other assemblies, without departing from the scope and spirit of the present invention.

What is claimed is:

1. A magnetic assembly comprising:
   a magnetic pole assembly configured to induce a magnetic flux in a pole tip;
   notched side shield means for shielding magnetic flux from the pole tip; and
   expanded non-magnetic gap means for reducing flux leakage from the pole tip.

2. The magnetic assembly of claim 1 wherein the pole tip includes a trailing edge and a leading edge located forward of the trailing edge and the notched side shield means includes side shields having leading side shield portions forward from the leading edge of the pole tip.

3. The magnetic assembly of claim 2 wherein the side shields are connected via a leading edge shield spaced forward from the leading edge of the pole tip.

4. The magnetic assembly of claim 1 wherein the notched side shield means includes side shields having inner side edges spaced from side edges of the pole tip and the inner side edges of the side shields are sloped to provide a tapered side shield width that decreases in a downtrack direction towards a trailing edge of the pole tip.

5. The magnetic assembly of claim 1 wherein the notched side shield means includes side shields having inner side edges spaced from side edges of the pole tip and the expanded non-magnetic gap means includes non-magnetic gap regions along a trailing portion of the pole tip formed by notched inner regions of the side shields, said notched inner regions defining inner trailing edges extending crosswise at a location proximate to a midpoint of the pole tip and notched inner side edges spaced from the inner side edges in a direction away from the pole tip.

6. The magnetic assembly of claim 5 wherein the inner side edges of the side shields are sloped to provide a tapered side shield width that decreases in a downtrack direction towards a trailing edge of the pole tip.

7. The magnetic assembly of claim 5 and comprising a trailing shield spaced downtrack from a trailing edge of the pole tip and a length of the non-magnetic gap regions extends between the inner trailing edges of the side shields and the trailing shield.

8. The magnetic assembly of claim 5 wherein the notched inner side edges are sloped to provide a decreasing side shield width in the downtrack direction.

9. A magnetic assembly comprising:
   a magnetic pole assembly configured to induce a magnetic flux in a pole tip having a leading edge, a trailing edge and side edges;
   a pole tip shield including side shields having sloped inner side edges spaced from the pole tip to form non-magnetic gap regions between the pole tip and the sloped inner side edges; and
   non-magnetic gap regions formed from notched inner regions of the side shields wherein the notched inner regions define inner trailing edges extending crosswise at a location between the leading and trailing edge of the pole tip and notched inner side edges spaced from the sloped inner side edges in a direction away from the pole tip.

10. The magnetic assembly of claim 9 wherein the sloped inner side edges are sloped to provide a decreasing side shield width in the downtrack direction towards a midpoint of the pole tip between the leading and trailing edges of the pole tip.

11. The magnetic assembly of claim 9 wherein the inner trailing edges of the side shields intersect the sloped inner side edges of the side shields proximate to a mid point of the pole tip.

12. The magnetic assembly of claim 9 wherein the side shields are coupled to a trailing shield downtrack from the pole tip.

13. The magnetic assembly of claim 9 wherein the side shields include an outer trailing edge spaced downtrack from the inner trailing edge and spaced forward from a trailing shield to form an outer non-magnetic gap region between the outer trailing edge of the side shields and the trailing shield.

14. The magnetic assembly of claim 9 wherein the side shields include an outer trailing edge spaced downtrack from the inner trailing edge at a location proximate to the trailing edge of the pole tip.

15. A magnetic assembly comprising:
   a magnetic pole assembly configured to induce a magnetic flux in a pole tip having a leading edge, a trailing edge and side edges;
   side shields disposed on opposed sides of the pole tip to provide a first side shield and a second side shield separate from and spaced from the first side shield and the first and second side shields having a leading edge spaced forward from the leading edge of the pole tip in a direction away from the trailing edge of the pole tip and inner side edges extending along a length of the first and second side shields to trailing edges extending crosswise, wherein the trailing edges intersect the inner side edges proximate to a mid point of the pole tip between the leading and trailing edges of the pole tip; and
   non-magnetic gap regions extending from the leading edges of the side shields to the leading edge of the pole tip, non-magnetic side gap regions between the first and second side shields and the side edges of the pole tip and a trailing non-magnetic gap region extending downtrack from the trailing edges of the side shields.

16. The magnetic assembly of claim 15 wherein the inner side edges of the side shield are sloped away from the pole tip to provide a decreasing side shield width in the downtrack direction towards the trailing edge of the side shields.

17. The magnetic assembly of claim 15 wherein the side shields include a notched inner region forming the trailing edge extending crosswise and intersecting the inner side edge proximate to the mid point of the pole tip.

18. The magnetic assembly of claim 15 wherein the side shields are truncated proximate to the mid-point of the pole tip to form the trailing edge extending crosswise and intersecting the inner side edge proximate to the mid point of the pole tip.

19. The magnetic assembly of claim 15 wherein a width of the non-magnetic side gap regions along the inner side edges is constant or increases in the downtrack direction.

20. The magnetic assembly of claim 15 wherein a width of the first side shield extends to a first side of the head and the width of the second side shield extend to a second side of the head.

* * * * *